United States Patent [19]

Ritter

[11] 4,048,864
[45] Sept. 20, 1977

[54] DRIVE WITH CONTINUOUSLY ADJUSTABLE SPEED VARIATION

[75] Inventor: Helmut Ritter, Wattwil, Switzerland

[73] Assignee: Heberlein Maschinenfabrik AG, Wattwil, Switzerland

[21] Appl. No.: 707,960

[22] Filed: July 23, 1976

[30] Foreign Application Priority Data

July 28, 1975 Switzerland ................. 9730/75

[51] Int. Cl.² .......................................... F16H 55/52
[52] U.S. Cl. ............................................ 74/230.17 F
[58] Field of Search ................................. 74/230.17 F

[56] References Cited

U.S. PATENT DOCUMENTS

| 3,600,960 | 8/1971 | Karig et al. | 74/230.17 F |
| 3,893,344 | 7/1975 | Dantlgraber et al. | 74/230.17 F |

*Primary Examiner*—Leonard H. Gerin
*Attorney, Agent, or Firm*—Larson, Taylor and Hinds

[57] ABSTRACT

A belt driving mechanism, providing a speed ratio that is infinitely variable between predetermined limits, of the type in which a belt embraces two pulleys adjustable in effective diameter depending on the separation of two conical discs, is described wherein an actuating element reciprocable between two abutments is mounted coaxially with the driving pulley which has an axially fixed disc and an axially adjustable disc. The actuating element carries a rod with a scale ring screwed onto its outer end, and to urge the axially adjustable disc towards the fixed disc, the actuating element moves the scale ring to take up clearance between itself and a thrust member connected by way of a thrust bearing with the adjustable disc and, on continued movement, to force the thrust member to move the adjustable disc. Each movement of the actuating element covers the full stroke between the abutments so that the movement of the disc is the difference between this stroke and the initial clearance of the scale ring, which clearance can be adjusted by turning the ring on the rod. The thrust member is a coaxial tube containing the actuating element, which may be a piston in an axially fixed cylinder mounted with an intervening journal bearing on a rotary shaft fixed to the axially fixed conical disc. The mechanism relieves the bearings of a motor that drives the shaft of any axial thrust. The speed ratio can be adjusted by the scale ring either when the drive is at a standstill or when it is working.

6 Claims, 2 Drawing Figures

DRIVE WITH CONTINUOUSLY ADJUSTABLE SPEED VARIATION

FIELD OF THE INVENTION

This invention relates to belt driving mechanisms providing a speed ratio that is infinitely variable between predetermined limits.

DESCRIPTION OF THE PRIOR ART

Such drives, as is commonly known, use as transmission means normal or wide wedge or V-belts which pass through wedge-shaped grooves of variable width between pairs of conical discs that are axially adjustable to provide pulleys of variable effective diameter. In such double disc drives with adjustable speed variation, however, each pair of conical discs comprise a disc rigidly connected with a shaft and a second disc axially shiftable on the shaft, which takes part in the rotation movement of the shaft. The displacement of the shiftable disc of the driving pair of conical discs may be achieved by means of an adjusting element, for example by means of a control spindle having a handwheel. The control spindle acts on a thrust bearing which is fixed against rotation with the disc and is loosely mounted on the driving shaft. By displacement of one of the discs, a position is imparted to the part of the wedge belt in the groove defined by the pair of driving discs, which is located at a greater or lesser radius with respect to the shaft axis. This adjustment is automatically transmitted to the part of the belt in the groove between the pair of driven discs, so that the radius of this part changes inversely to the radius of the driving part. A spring between the driven discs automatically adapts the driven discs to this change. Such drives have the disadvantage that the conical discs can only be shifted during operation.

SUMMARY OF THE INVENTION

It is the purpose of the present invention to eliminate this disadvantage by providing a drive with an infinitely adjustable speed ratio in which adjusting of the control disc is possible either while the drive is at standstill or when the mechanism is in operation.

Accordingly, the object of the present invention is a drive with an infinitely adjustable speed ratio comprising, at least on the driving side, a pair of conical discs with a variable effective diameter and an adjusting device for the displaceable disc which is characterized in that the adjusting device comprises a hollow cylindrical thrust member connected with a thrust bearing on the displaceable conical disc and an element performing a reciprocating movement in the thrust member between two abutments and having a rod connected therewith, at the end of which rod there is fixed a threaded pin on which there is provided a scale ring or disc which can be adjusted by rotation on the pin, the ring or disc being arranged to move at the beginning of a stroke of the reciprocating element, towards an end face of the thrust member and to abut against the thrust member during the continuation of the stroke, the end of the rod protruding from the end face of the thrust member, so that the displaceable conical disc is displaceable by the thrust member by a distance which is the difference between the total stroke of the reciprocating element and the free stroke of the scale ring or scale disc prior to abutting against the thrust member.

According to an advantageous embodiment of the drive of the present invention, the reciprocating element is a piston shiftable within a cylinder and actuatable pneumatically or hydraulically. The cylinder may be fixed to the outer ring of a bearing the inner ring of which is fixed onto a pin which is rigidly connected with the shaft of the driving motor.

DESCRIPTION OF THE DRAWINGS

An example of the present invention will now be described in more detail with reference to the accompanying merely schematical drawings, wherein.

Figure 1:
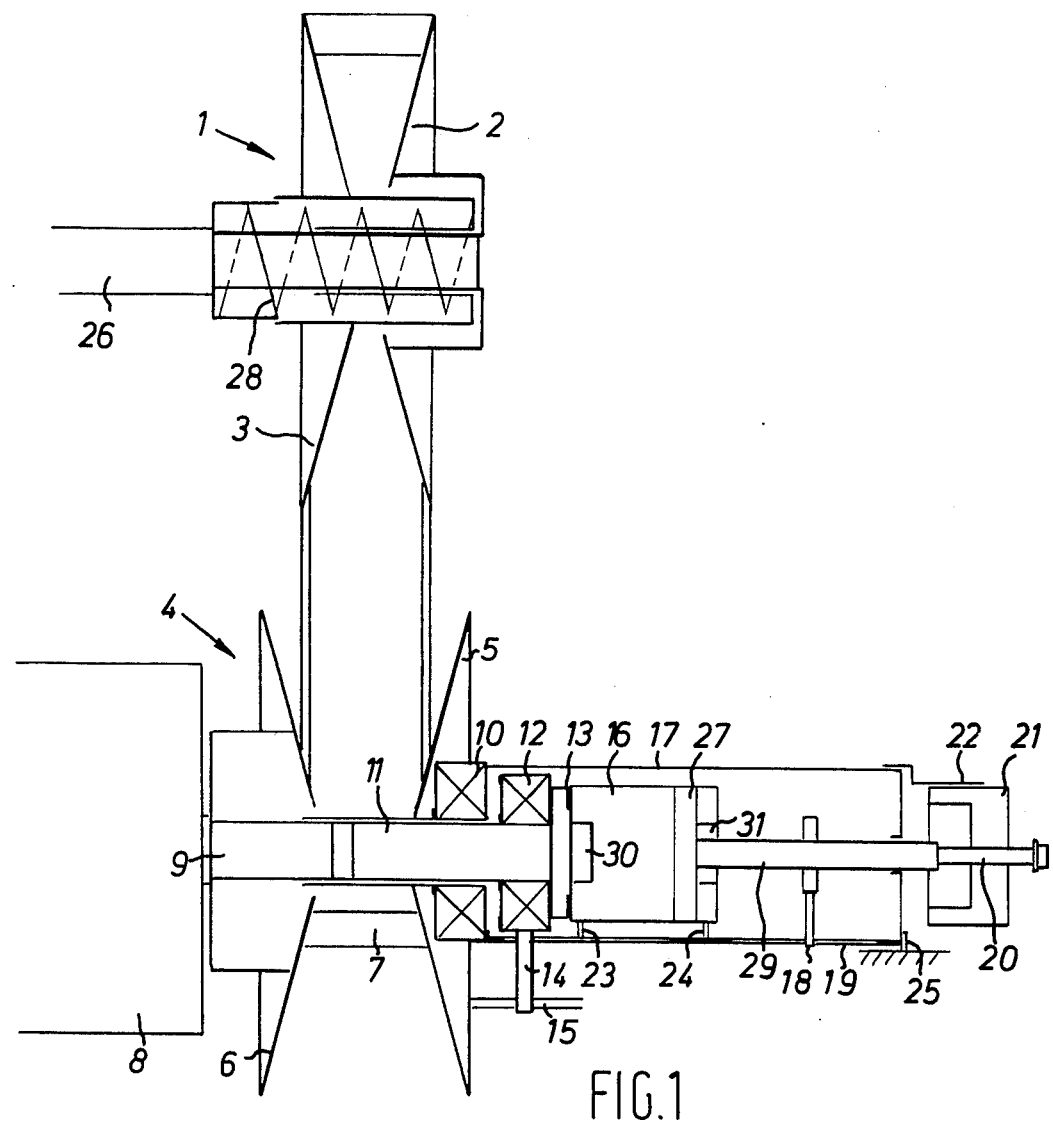
FIG. 1 shows a sectional elevation of a drive mechanism providing an infinitely variable speed ratio, when set for one ratio.

In the drawings, 4 designates a driving pair of conical discs comprising a conical disc 6 rigidly connected with shaft 9 of a driving motor 8 and an axially displaceable conical disc 5. The motor shaft 9 is connected with a bearing pin 11 by means of a fixing screw (not shown), at one end of which pin 11 an inner race of a bearing 12 is fixed. The conical disc 5 is fixed to a sleeve arranged to slide on the pin 11. A driven pair of conical discs 1 consists of a conical disc 2 fixed to a driven or output shaft 26, and of an axially movable conical disc 3 loaded by a compression spring 28. A wedge shaped or V-belt 7 embraces the driving and driven pairs of conical discs.

The displaceable conical disc 5 is adjusted by a hollow cylindrical thrust member 17 which does not rotate and is fixed to the outer race of a thrust bearing 10 mounted on the sleeve of disc 5. Inside the member 17 a non-rotatable cylinder 16 is fixed on a ring 13 which is fixed on the outer race of bearing 12. Serving as an actuating element, there is provided piston 27 with piston rod 29 on the end of which there is fixed the threaded pin 20, the end of the piston rod protruding through a central bearing in an end abutment plate on thrust member 17. A scale ring 21 is threaded onto the pin 20 so that it can be brought by rotating the ring 21 into a selected position indicated by pointer 22.

The piston is actuated by compressed air fed through pipe connections 23, 24 and moves between abutments 30, 31 provided at two end plates on the cylinder 16. The thrust member 17 is guided longitudinally and non-rotatably by means of guide pin 14 fixed on the outer race of bearing 12 and passing through a slot in the wall of member 17 into a guide groove 15 provided in a frame portion. The piston rod 29 is guided longitudinally and non-rotatably by means of guide pin 18 passing through a guide groove 19 provided in the wall of the thrust member 17. In the standstill condition, the thrust member 17 lies near to an abutment 25 situated on a part of the frame.

Figure 2:
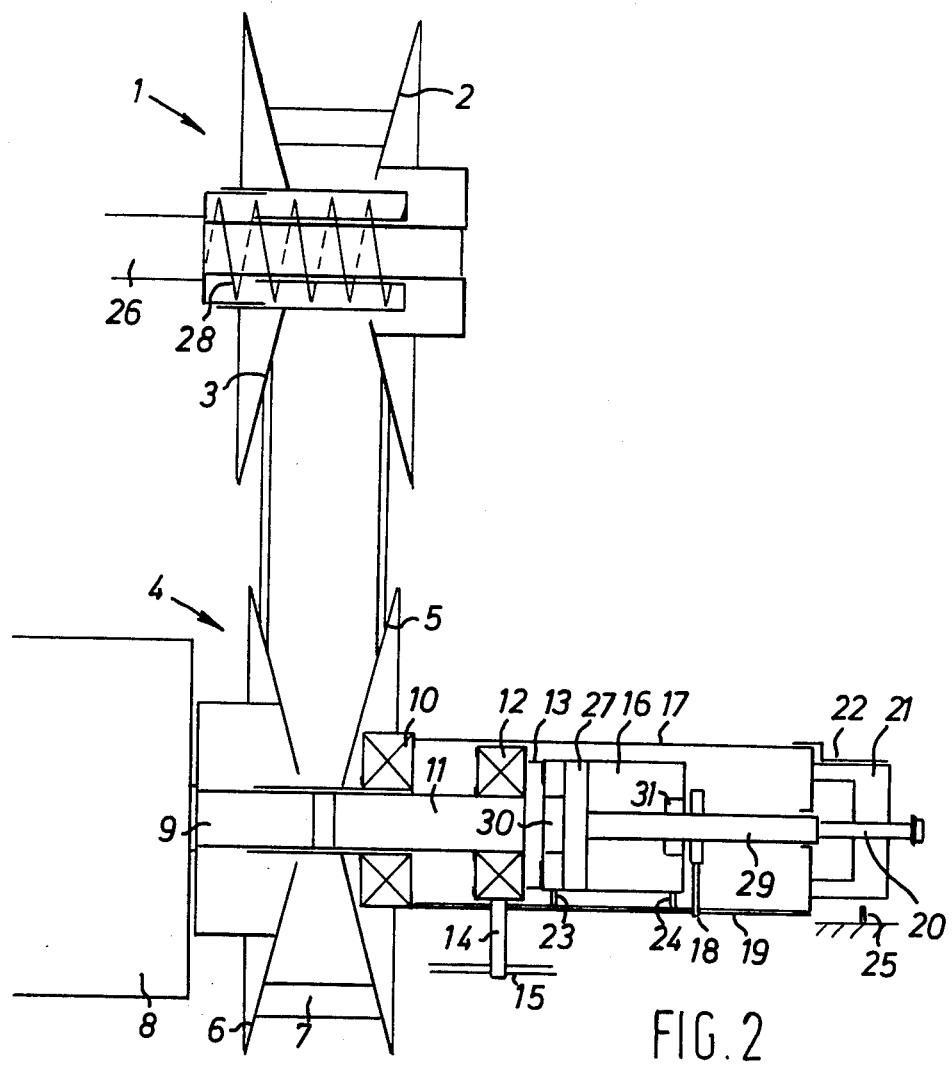
FIG. 2 shows the drive mechanism of FIG. 1, when set for another ratio.

The drive mechanism shown in the drawings functions as follows:

First, the scale ring 21 is brought into a required position indicated by pointer 22 by rotation of the ring by hand, which corresponds to a desired speed of the driven pair of conical discs 1 and of the driven shaft 26 when acceleration of the drive is terminated. By switching on motor 8, the drive is put into operation, and the driven pair of conical discs 1 rotates at the lowest possible revolution speed. A valve (not shown) between a compressed air container (not shown) and the pipe connections 23, 24 is now automatically opened whereby compressed air is fed to the connection 24 and evacuated through connection 23. The piston is thereby separated from abutment 31 and moves until it reaches abutment 30. During this stroke first, by means of piston rod 29 and of the threaded pin 20, the scale ring is moved towards the end plate of the thrust member 17 and remains (FIG. 2) applied against the end plate during the rest of the stroke. The thrust member 17 now presses, via the thrust bearing 10, against the axially shiftable conical disc 5 which is thereby displaced by a distance which is the difference between the total stroke of piston 27 and the free stroke of the scale ring 21 to the end plate of the thrust member 17. Thereby, the wedge belt 7 in the pair of driving discs 4 is caused to move into a position corresponding to a larger diameter and, in the driven pair of conical discs 1, into a position corresponding to a smaller diameter, the axially displaceable conical disc 3 being displaced against the action of compression spring 28. The driven shaft 26 is then driven at the speed previously set by means of the scale ring 21 as soon as piston 27 has reached the abutment 30.

The axial force acting on the conical disc 5 is transmitted to the axially stationary conical disc 6 by belt 7 and from the disc 6 to cylinder 16 by motor shaft 9, bearing pin 11, bearing 12 and ring 13. Therefore, a closed force transmission path is obtained, no axial forces being transmitted to the motor bearings.

Displacement of scale ring 21 during operation can be effected as in the stand-still condition, but the speed of the driving shaft 26 is no more indicated on the scale by means of pointer 22, but must be ascertained by means of a separate measuring instrument (not shown) on the shaft 26.

Upon interruption of operation, either because the motor is switched off or because of interruption of the current supply, the speed controlling mechanism is automatically brought into the starting condition with the speed of the driven shaft 26 limited to the lowest value in relation to the speed of the driving shaft by means of a valve (not shown) which effects reversal of the current of compressed air so that the compressed air is fed through the pipe connection 23 and evacuated through pipe connection 24. Thus, the piston 27 is now moved back from abutment 30 to abutment 31.

The stroke speed of piston 27 may be adjusted by known means (not shown), for example by a throttle, and may be different for the two stroke directions. The stroke speed may for example be 40 seconds for moving the piston 27 from abutment 31 to abutment 30, but only 20 seconds for movement back from abutment 30 to abutment 31.

Instead of the pneumatically actuatable piston 27, also other reciprocating elements may be used, such as for example a hydraulically actuatable piston or an adjusting spindle or adjusting hub, provided with a control motor, such as an electromagnetic motor.

The drive according to the present invention has a number of advantages. First the output speed may be adjusted through an infinite range within determined limits either at standstill or when the mechanism is in operation. Furthermore, the motor bearings are loaded neither at standstill nor during operation by the axial force acting on the axially shiftable driving conical disc.

Furthermore, the stroke of the stroke element (e.g. piston 27) of the adjusting device is constant for the whole range of the driving speeds, i.e. the shifting of the stroke element may be effected for the whole control range between the same abutments. Finally, the speed control drive is automatically brought back into the starting condition with the smallest output speed in case of interruption of the energy supply.

I claim:

1. For use in a belt driving mechanism providing a speed ratio that is infinitely variable between predetermined limits, an adjustable pulley mechanism comprising a driving member rotatable about an axis, a first conical disc coaxially fixed to said driving member, a second conical disc coaxially mounted on said driving member to slide towards and away from said first conical disc, said conical discs being mounted to provide an annular wedge-shaped groove therebetween tapering towards said axis for receiving in said groove a belt having a wedge-shaped cross-section, a hollow cylindrical thrust member for thrusting said second disc towards said first disc mounted coaxially with said discs for axial movement, a thrust bearing interposed between said thrust member and said second disc, means holding said thrust member in a set position about said axis, an element mounted to reciprocate within said thrust member, two abutment members respectively mounted for limiting opposite ends of the reciprocating movement of said element, a rod connected to said element for reciprocation therewith, said rod protruding from said thrust member at an end thereof remote from said discs, an abutment member adjustably mounted on said rod beyond said thrust member, said abutment member being adapted for fixing to said rod in any one of a range of positions thereon and for abutting against said end of said thrust member on movement of said rod in a direction towards said discs, and means for actuating said element to move from one of said abutments to the other of said abutments while initially moving said abutment member, by way of said rod, into engagement with said thrust member and thereafter moving said thrust member and said second disc from an initial position axially towards said first disc, whereby the distance moved by said second disc is the difference between the total stroke of said reciprocable element between said abutment members and the distance moved by said abutment member prior to engaging said thrust member.

2. A pulley mechanism according to claim 1, in which said rod is provided at its end protruding from said thrust member with an external screw thread and said abutment member is formed with a mating internal screw thread whereby said abutment member is adjustable along said rod by rotation.

3. A pulley mechanism according to claim 1, wherein said element is a double-acting piston and the pulley mechanism includes a cylinder mounted within said thrust member and wherein said piston is reciprocable, said actuating means comprising conduits for conveying pressure fluid into and out of said cylinder to act on opposite faces of said piston.

4. A pulley mechanism according to claim 3, in which said cylinder is coaxially mounted with respect to said driving member by means locating said cylinder in a fixed position along said axis including a journal bearing interposed between said driving member and said cylinder.

5. A pulley mechanism according to claim 1, including means for adjusting the speed of movement of said reciprocable element.

6. A pulley mechanism according to claim 1, comprising a motor for rotating said driving member and means for automatically returning said element from said other of said abutments to said one of said abutments to return said second disc to said initial position, when rotation of said motor ceases.

* * * * *